(12) United States Patent
Szpilfogel et al.

(10) Patent No.: US 8,175,263 B2
(45) Date of Patent: May 8, 2012

(54) INTEGRATED THIN CLIENT AND TELEPHONY DEVICE

(75) Inventors: Christian Szpilfogel, Ottawa (CA); Thomas A. Gray, Mansfield (CA)

(73) Assignee: Mitel Networks Corporation, Ottawa, Ontario ( * ) Notice: Subject to any disclaimer, the term of this patent is extended or adjusted under 35 U.S.C. 154(b) by 456 days.

(21) Appl. No.: 12/383,739

(22) Filed: Mar. 26, 2009

(65) Prior Publication Data
US 2010/0246806 A1    Sep. 30, 2010

(51) Int. Cl.
*H04M 1/00* (2006.01)
*H04M 9/00* (2006.01)

(52) U.S. Cl. .................. 379/428.03; 379/428.01

(58) Field of Classification Search ....... 379/428.01–429, 379/433.04, 433.05; 370/352
See application file for complete search history.

(56) References Cited

U.S. PATENT DOCUMENTS

| | | |
|---|---|---|
| 5,454,032 A | 9/1995 | Pinard et al. |
| 6,163,692 A | 12/2000 | Chakrabarti et al. |
| 6,311,165 B1 | 10/2001 | Coutts et al. |
| 6,438,577 B1 | 8/2002 | Owens |
| 7,223,123 B2 | 5/2007 | Brooks |
| 2004/0039847 A1 | 2/2004 | Persson et al. |
| 2004/0153875 A1 | 8/2004 | Amyot et al. |
| 2005/0099999 A1* | 5/2005 | Phillips et al. ............... 370/352 |
| 2005/0141691 A1 | 6/2005 | Wengrovitz |

OTHER PUBLICATIONS

"CallDesk—A Thin-client Agent Desktop" Marketing White-paper; Lakshya . . . The Missing Link; Oct. 20, 2007; Arindam Chakravorty for LAKSHYA Solutions Limited / India.

Guerin, Marcel "Using Solaris Resource Manager With Sun Ray" Sun BluePrints OnLine—Sun Microsystems, Inc., Jun. 2004, Santa Clara, CA.

"This Just In: U.S. Cell Phone Users on the Move Are Talking, Not Typing" Business Wire, Dec. 16, 2004, Santa Barbara, CA.

"Using Smart Cards With the Sun Ray 1 Enterprise Applicance" A Customer Brief; Sun Microsystems, Inc., Sep. 1999, Palo Alto, CA.

* cited by examiner

*Primary Examiner* — Tuan Nguyen

(57) ABSTRACT

A telephony apparatus connectable to a communication network and printed circuit board are provided. The telephony apparatus includes a package having a telephone footprint and comprising at least one connector to the communication network; a thin client device housed within the package, the thin client device connectable to a thin client display and a thin client input device; a stimulus telephony device housed within the package, the stimulus telephony device comprising a telephony display and telephony input device, the stimulus telephony device connectable to an audio input device; and the thin client device and the stimulus telephony device are further connectable to the communication network via the at least one connector.

20 Claims, 8 Drawing Sheets

INTEGRATED THIN CLIENT AND TELEPHONY DEVICE

FIELD OF INVENTION

The specification relates generally to telephony devices, and specifically to an integrated thin client and telephony device.

BACKGROUND OF INVENTION

The use of a thin-client/server environment is becoming increasingly popular since it provides, among other things, lower cost in relation to the common personal computer alternative. Nonetheless, a thin-client necessitates a computing apparatus of suitable computing power located at a work station, in addition to associated display and input devices. In general, a thin client provides convenient access to media for collaboration in a work environment except that of voice collaboration. While a "softphone" can also be supplied using a thin client, along with associated earphone jacks and voice circuitry, such arrangements have not found great favour as it is up to a user to ensure that the application is running at all times and that it is sufficiently in the foreground of a display device to originate calls and provide adequate alerts to incoming calls, etc. This is made worse during collaboration in that the softphone application will inevitably be sent to the background as documents etc. are consulted. Indeed, a benefit of modern collaboration and telephone feature software is that pertinent information may be had at a glance thus preventing distraction from current activities. For example, caller id provides the identity of a caller and, hence the relevance of an incoming call can be quickly ascertained. Further to this, buddy lists provide a quick indication of the availability of potential collaborators; a softphone, which can be sent to the background or clutter the foreground of a display, does not lend itself to such affordances.

Hence, for these and other reasons, it is common to provide a conventional IP or analog telephone set in addition to the thin client device and associated display and data entry devices such that a telephone set is always active and physically accessible, with dedicated displays and keys etc. However providing both a thin client device and a telephone set can be problematic in collaboration applications because the telephone set and thin client must be associated with each other so that applications can interact properly. The creation of this association can be a costly and error prone management task.

BRIEF DESCRIPTION OF THE DRAWINGS

Embodiments are described with reference to the following figures, in which.

DETAILED DESCRIPTION OF THE EMBODIMENTS

Figure 1:
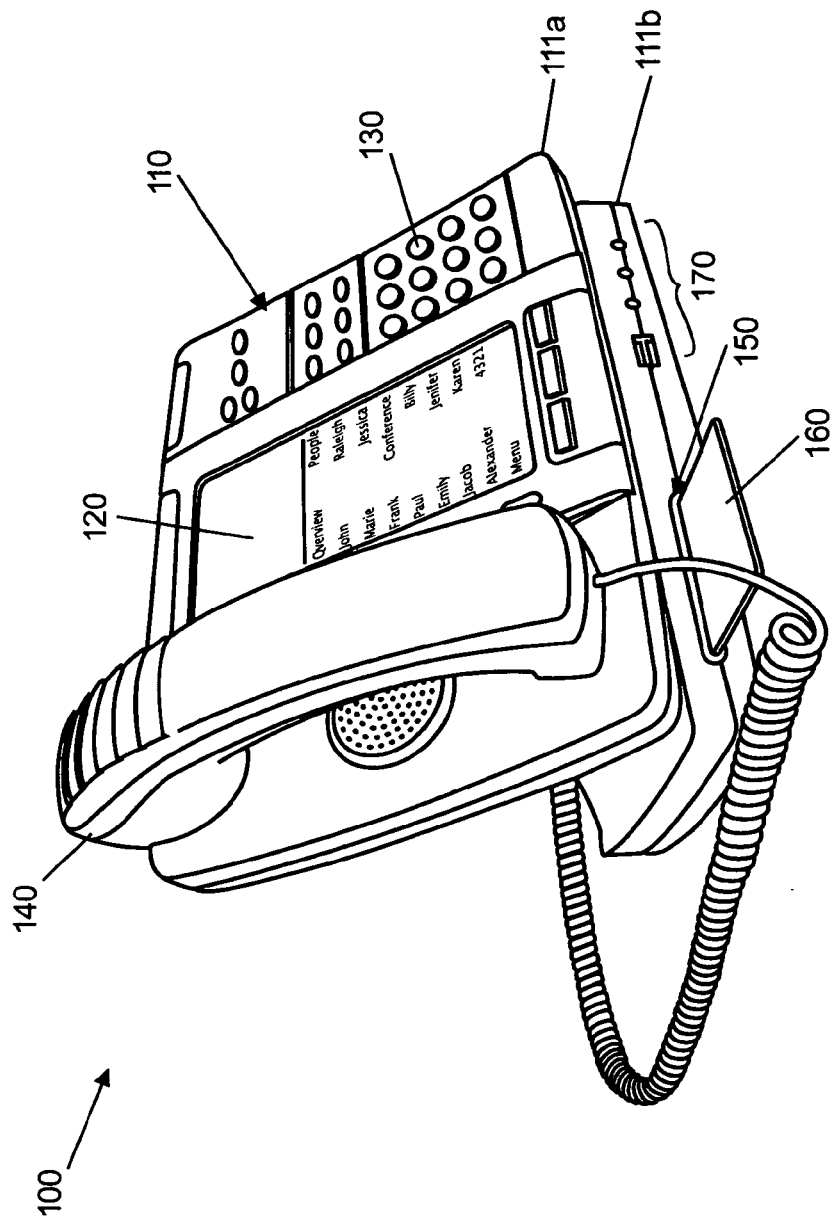
FIG. 1 depicts a front view of telephony apparatus comprising integrated thin client and telephone devices, according to non-limiting embodiments.

A first aspect of the specification provides a telephony apparatus connectable to a communication network. The telephony apparatus comprises a package having a telephone footprint and comprising at least one connector to the communication network. The telephony apparatus further comprises a thin client device housed within the package, the thin client device connectable to a thin client display and a thin client input device. The telephony apparatus further comprises a stimulus telephony device housed within the package, the stimulus telephony device comprising a telephony display and telephony input device, the stimulus telephony device connectable to an audio input device. The thin client device and the stimulus telephony device are further connectable to the communication network via the at least one connector.

The thin client device and the stimulus telephony device can be enabled to share the at least one connector.

The package can comprise: a telephone housing comprising the stimulus telephony device; and a base connected to the telephone housing, the base comprising the thin client device and the at least one connector.

The telephony apparatus can further comprise a printed circuit board comprising circuitry for the thin client device and the stimulus telephony device. The circuitry can be shared between the thin client device and the stimulus telephony device.

The telephony apparatus can further comprise a processor shared between the thin client device and the stimulus telephony device.

The thin client device can comprise the stimulus telephony device.

The telephone footprint can comprise a wireless telephone footprint, and the at least one connector can be adapted for connection to a wireless communication network.

The telephony apparatus can further comprise a display comprising the thin client display and the telephony display.

The telephony apparatus can further comprise an input device comprising the thin client input device and the telephony input device.

The telephony apparatus can further comprise at least one of a power supply and a power supply connector.

The thin client device can comprise a thin client card apparatus for accepting a thin client identification card.

The thin client device and the stimulus telephony device can be associated via respective identifiers, such that each of the thin client device and the stimulus telephony device can communicate with the other of the thin client device and the stimulus telephony device. The respective identifiers can be utilized by at least one external application such that the at least one external application can interact with both the thin client device and the stimulus telephony device in parallel.

The package having a telephone footprint can comprise at least one of a laptop computer, a PDA, and a mobile communication device.

A second aspect of the specification provides a printed circuit board (PCB). The PCB comprises a thin client device connectable to a thin client display and a thin client input device. The PCB further comprises a stimulus telephony device connectable to a telephony display, a telephony input device, and an audio input device. The thin client device and the stimulus telephony device are further connectable to the communication network via at least one connector.

The thin client device and the stimulus telephony device can be enabled to share the at least one connector.

The PCB can further comprise circuitry for the thin client device and the stimulus telephony device. The circuitry can be shared between the thin client device and the stimulus telephony device.

The thin client device can comprise the stimulus telephony device.

Figure 2:
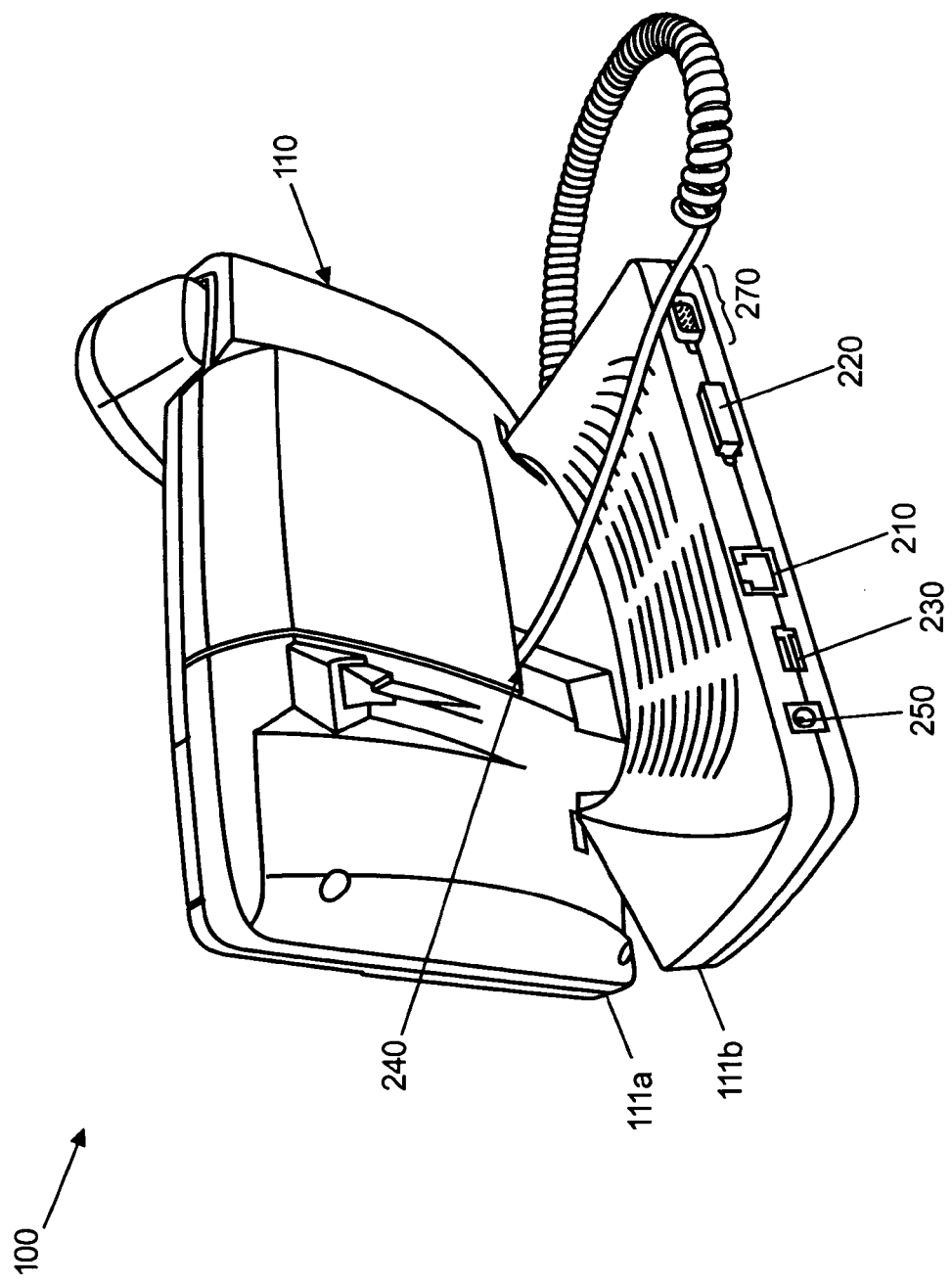
FIG. 2 depicts a rear view of the telephony apparatus of FIG. 1, according to non-limiting embodiments.

FIGS. 1 and 2 respectively depict a front and rear view of telephony apparatus 100 connectable to a communication network. Telephony apparatus 100 comprises a package 110 having a telephone footprint. Package 110 can comprise a telephone housing 111*a* and a base 111*b*; however the configuration of packaging 110 is generally non-limiting. For example, packaging 110 having a telephone footprint can comprise at least one of a laptop computer, a PDA, and a mobile communication device. As will be described below with reference to FIG. 4, telephony apparatus 100 further comprises a thin client device 410 and a stimulus telephone device 420. Telephony apparatus 100 further comprises telephony display 120 and telephony input device 130 which can be dedicated to providing and receiving data associated with stimulus telephone device 420.

As depicted in FIG. 2, telephony apparatus 100 further comprises at least one connector 210 for connecting telephony apparatus 100 to a communication network. In some embodiments, at least one connector 210 can comprise a local area network (LAN) connector, though it is understood that any suitable connector is within the scope of present embodiments.

Though, in depicted embodiments, at least one connector 210 is enabled to accept a wired connection to a communication network, it is understood that in other embodiments at least one connector 210 can be enabled to wirelessly connect telephony apparatus 100 to a communication network.

Figure 3:
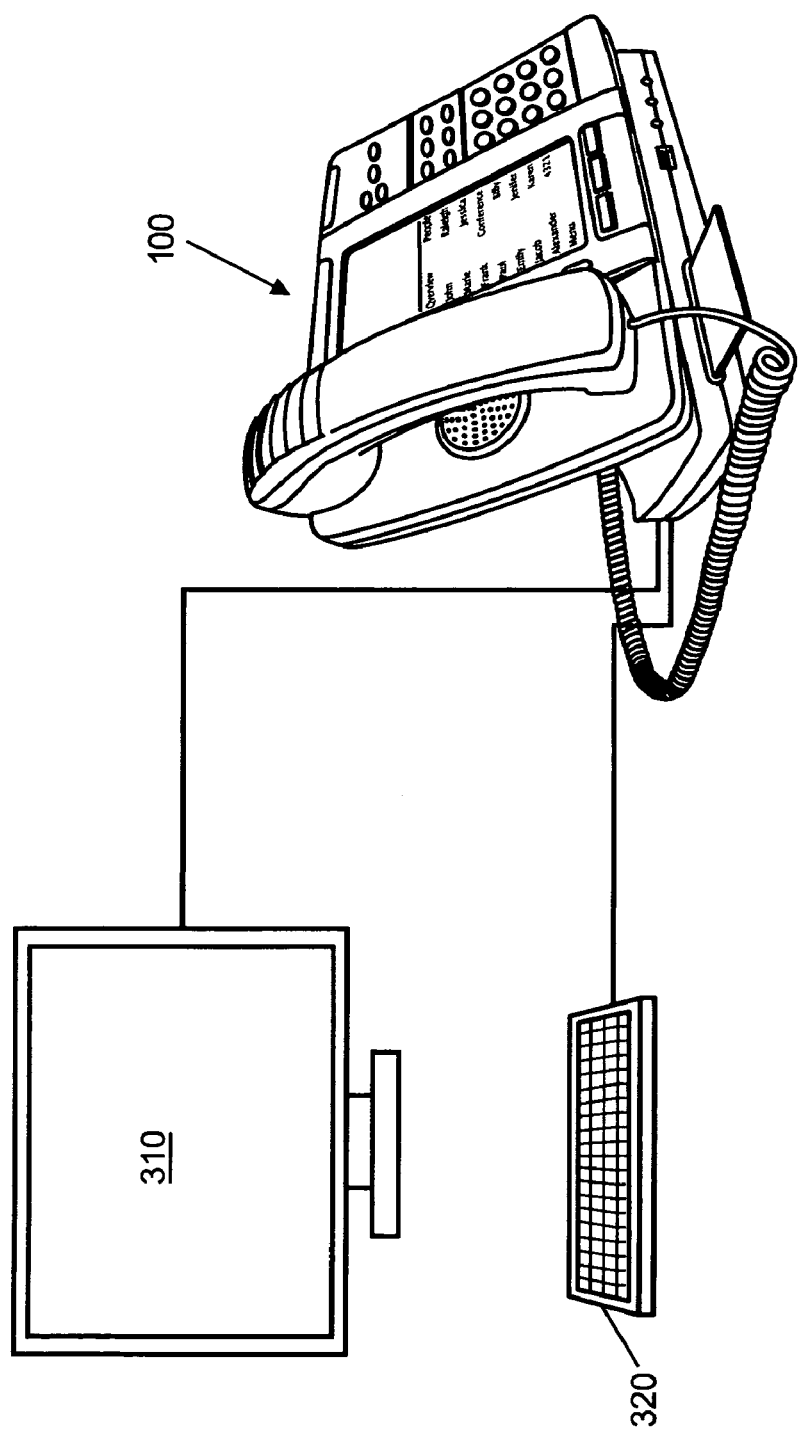
FIG. 3 depicts the telephony apparatus of FIG. 1 connected to an external display and input device, according to non-limiting embodiments.

Telephony apparatus 100 further comprises at least one display connector 220 for connecting telephony apparatus to a thin client display 310, and an input device connector 230 for connecting telephony apparatus 100 to a thin client input device 320; for example, as depicted in FIG. 3, can be connected to thin client display device 310 and thin client input device 320 during the operation of thin client device 410, with thin client display device 310 and thin client input device 320 dedicated to providing and receiving data associated with thin client device 410.

Telephony apparatus 100 can further comprise an audio connector 240 for connecting telephony apparatus 100 to an audio device 140, such as a handset (as depicted), for providing and receiving audio data associated with stimulus telephone device 420.

Telephony apparatus 100 can further comprise a power connector 250 for connecting telephony apparatus 100 to a power supply (as depicted), such as a power outlet and/or a power adaptor. In other embodiments, telephone apparatus 100 can be battery powered, with an associated battery connector/battery receptacle (not depicted).

Referring back to FIG. 1, in some embodiments, telephony apparatus 100 comprises a thin client card apparatus 150 for accepting a thin client identification card 160. In further embodiments, telephone apparatus 100 comprises any suitable number of further connectors 170 located on the front of telephony apparatus 100, and any suitable number of further connectors 270 located on the back of telephony apparatus 100. Further connectors 170, 270 can include, but are not limited to, USB connectors, microphone connectors, headset connectors, other display connectors, other network connectors and the like.

Figure 4:
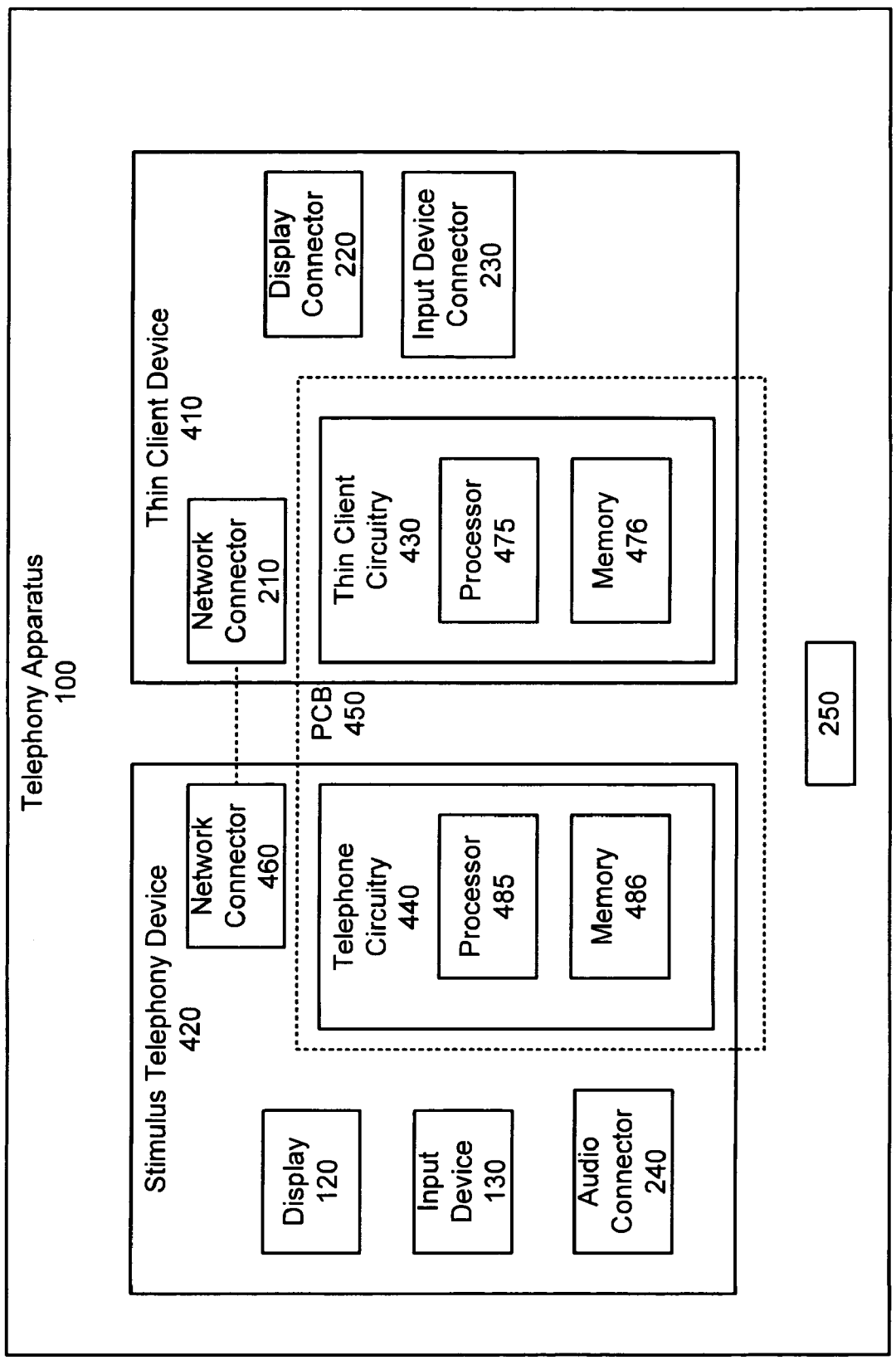
FIGS. 4, 5 and 6 depicts block diagrams of telephony apparatuses comprising integrated thin client and telephone devices, according to non-limiting embodiments.

Attention is now directed to FIG. 4, which depicts a block diagram of telephony apparatus 100, according to non-limiting embodiments. Telephony apparatus 100 further comprises thin client device 410 housed within package 110, thin client device 410 connectable to thin client display 310 and thin client input device 320 via connectors 220, 230, as described above. Thin client device 410 comprises thin client circuitry 430. In some embodiments thin client device 410 comprises a first printed circuit board (PCB), which can comprise at least a portion of thin client circuitry 430. Telephony apparatus 100 further comprises stimulus telephony device 420 housed within package 110, stimulus telephony device 420 comprising telephony display 120 and telephony input device 130, stimulus telephony device 420 connectable to an audio input/output device 140, such as a handset via audio connector 240, as described above. Stimulus telephony device 420 comprises telephony circuitry 440. In some embodiments stimulus telephone device 420 comprises a second PCB, which can comprise at least a portion of telephone circuitry 440. In some embodiments, the first and second PCBs can be fixed to each other and to package 110 by suitable connectors, including but not limited to bolts and spacers, and the like. Electrical interconnection between PCBs/devices 410, 420 can be provided via any suitable cabling. Alternatively a small backplane could be provided and electrical interconnections made with edge connectors. In yet further embodiments, a PCB 450 can comprise at least a portion of both thin client circuitry 430 and telephony circuitry 440 (as depicted).

Thin client device 410 and stimulus telephony device 420 are connectable to a communication network via at least one connector 210. In some embodiments, thin client device 410 and stimulus telephony device 420 are enabled to share the at least one connector 210. In other embodiments, telephony apparatus 100 comprises at least a second network connector 460, similar to at least one connector 210, with thin client device 410 comprising at least one connector 210 and stimulus telephony device 420 comprising at least a second network connector 460, in a one-to-one relationship. In yet further embodiments, as depicted, connector 210 and connector 460 are in turn connectable to each other such that a connection from either of connector 210 and connector 460 to a communication network enables both thin client device 410 and stimulus telephony device 420 to be connected to the communication network. In general, this enables telephony apparatus 100 to be connected to the communication network via a single network connector. In other embodiments, thin client device 410 and stimulus telephony device 420 can share a single network connector, such as connector 210.

In any event, telephony apparatus 210 can simultaneously act as the client in a client/server environment, via thin client device 410, while providing telephone services in a stimulus protocol environment via stimulus telephone device 420. Indeed, each of thin client 410 and stimulus telephony device 420 function by receiving data and transmitting data to a respective server for processing, via at least one connector 210, such that minimal processing of data is performed at telephony apparatus 100. Integration of thin client device 410 into telephony apparatus 100 generally saves cost and clutter on a desktop by reducing the amount of equipment deployed.

In some embodiments, thin client device 410 and stimulus telephony device 420 can be factory pre-configured, such that any software association between them can be pre-configured as well. For example, the firmware in one or the other or both can be set so that each device 410, 420 is aware of each other's identity by way of suitable respective identifiers, including but not limited to a MAC address, or any other suitable mechanism. This association can be conveyed to a database located in a communication network, where it can be used for auto-login processes (e.g. auto-login into the communication network etc.) or for other purposes. For example, the respective identifiers can be utilized by at least one external application such that the at least one external application can interact with both thin client device 410 and stimulus telephony device 420 in parallel.

In some embodiments, thin client device 410 can be housed within base 111*b* and stimulus telephone device 420 can be housed within telephone housing 111*a*, however it is understood that the physical configuration and location of thin client device 410 and stimulus telephony device 420 within telephone apparatus 100 is generally non-limiting. For example both thin client device 410 and stimulus telephony device 420 can be housed within telephone housing 111*a*.

In some embodiments, each of thin client device 410 and stimulus telephone device 420 can comprise respective processors 475, 485 and memories 476, 486. While not depicted, each device 410, 420 can further comprise separate power supplies and/or power supply connectors, similar to connector 250.

Figure 5:
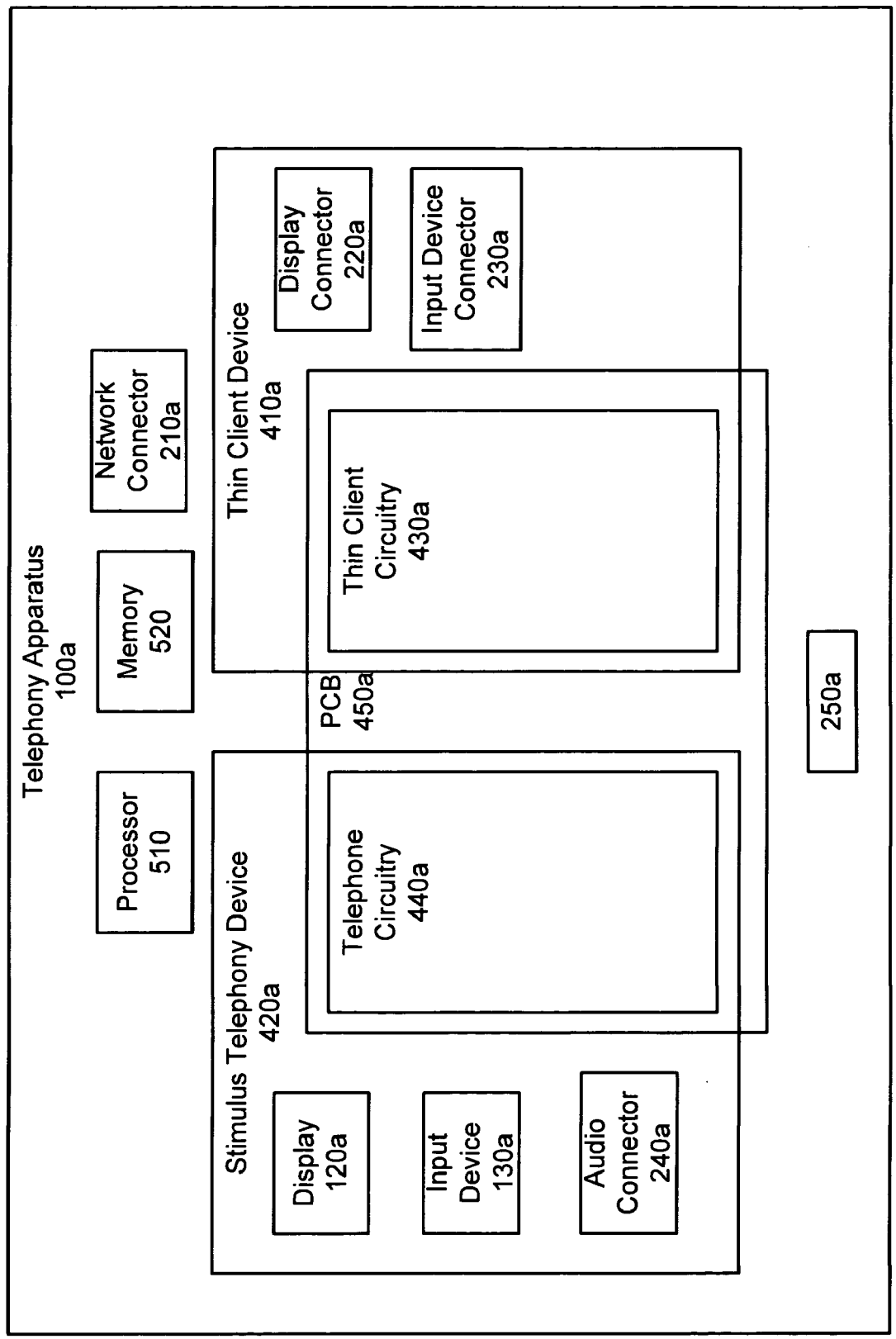

Attention is now directed to FIG. 5, which depicts a block diagram of telephony apparatus 100*a*, according to non-limiting embodiments. Telephone apparatus 100*a* is similar to telephony apparatus 100, with like elements having like numbers, however with an "a" appended to each number, except for differences described herein: for example, network connector 210*a* is similar to network connector 210. Furthermore, in these embodiments, a single PCB 450*a* comprises thin client circuitry 430*a* and telephone circuitry 440*a*, such that resources can be shared between thin client device 410*a* and stimulus telephone device 420*a*. For example, devices 410*a*, 420*a* can share the same power supply connector 250*a* and/or power supply and a network connector 210*a* can be shared between devices 410*a*, 410*b* via PCB traces. Hence, further cost savings over the configuration of FIG. 4 is achieved.

Furthermore, in some embodiments, as depicted in FIG. 5, thin client device 410*a* and stimulus telephone device 420*a* can further share resources including a processor 510 and a memory 520, such that tasks for each device 410*a*, 420*b* run on processor 510 and data for each are stored in memory 520. Specialized circuitry 430*a*, 440*a*, which can provide specific telephone transmission and signaling services (including but limited to display drivers, digital signal processors (DSPs), Dual-tone multi-frequency (DTMF) receivers and senders, codecs, speakerphones and/or connectors, handsets and/or connectors, and plugs and/or connectors) as well as interfacing with thin client display and device connectors 220*a*, 230*a*, can remain separate.

It is understood that each of thin client device 410/410*a* and stimulus telephone device 420/420*a* functions analogously, as each device 410/410*a*, 420/420*a* accepts input from a respective input device 320, 130, and provides data on a respective display 310, 120. Furthermore, each device 410/410*a*, 420/420*a* interacts with a central application server for providing their respective service. The central application server will be call server in case of stimulus telephone device 420/420*a* and a thin client server in case of thin client device 410/410*a*. Thus both devices 410/410*a*, 420/420*a* can be merged to create a composite desktop collaboration device that will act to supply and receive all suitable media.

Figure 6:
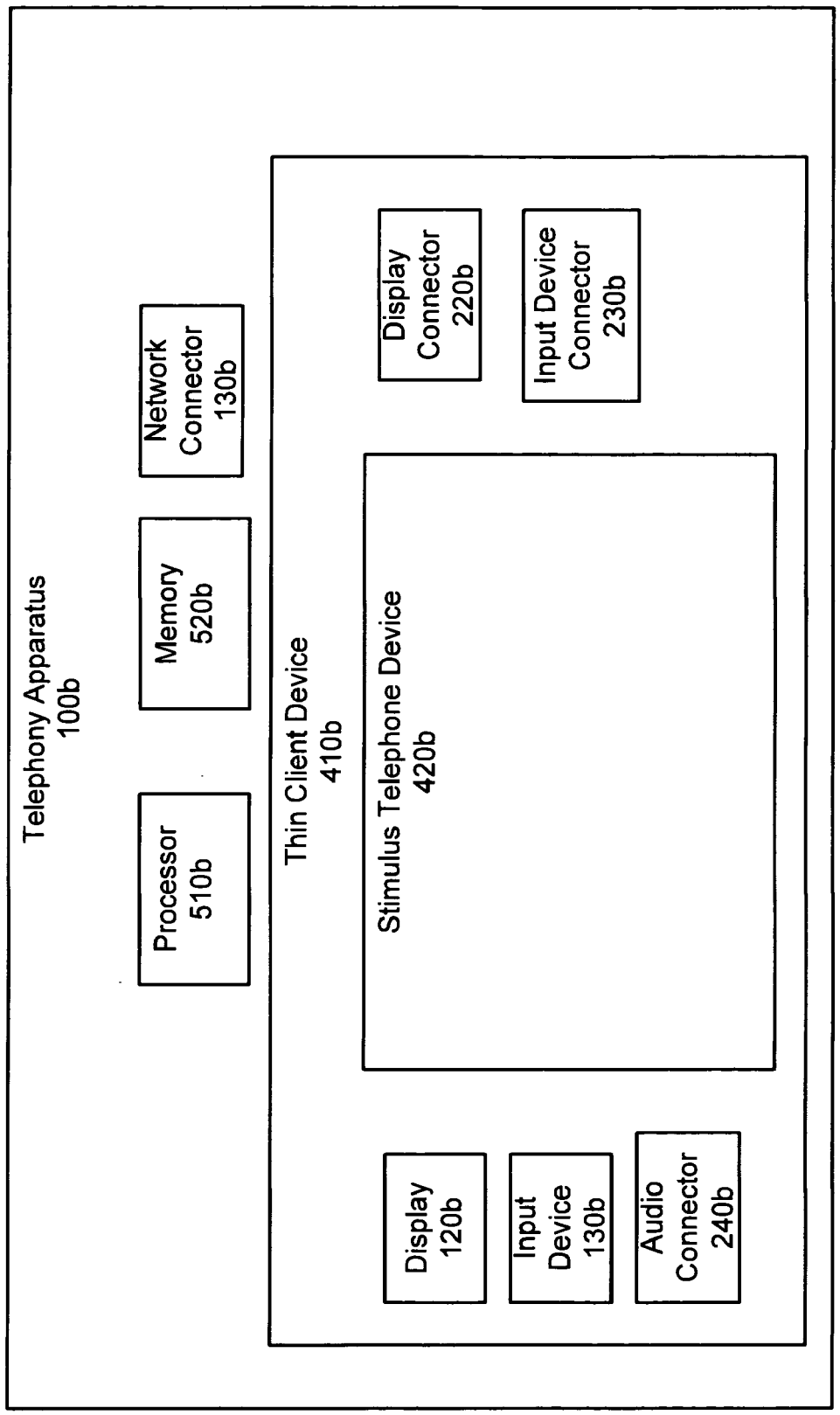

For example, as depicted in FIG. 6, a telephony apparatus 100*b* (similar to telephony apparatus 100, with like elements having like numbers appended with a "b") can be regarded as an extended thin client, and comprising a thin client device 410*b*, which in turn comprises (and/or subsumes) a stimulus telephone device 420*b*. Telephony apparatus 100*b* further comprises two displays and/or display connectors, 120*b*, 220*b* and two sets of input devices and/or input device connectors 130*b*, 230*b*, that can be used for input and output for each respective device 420*b*, 410*b*.

Figure 7:
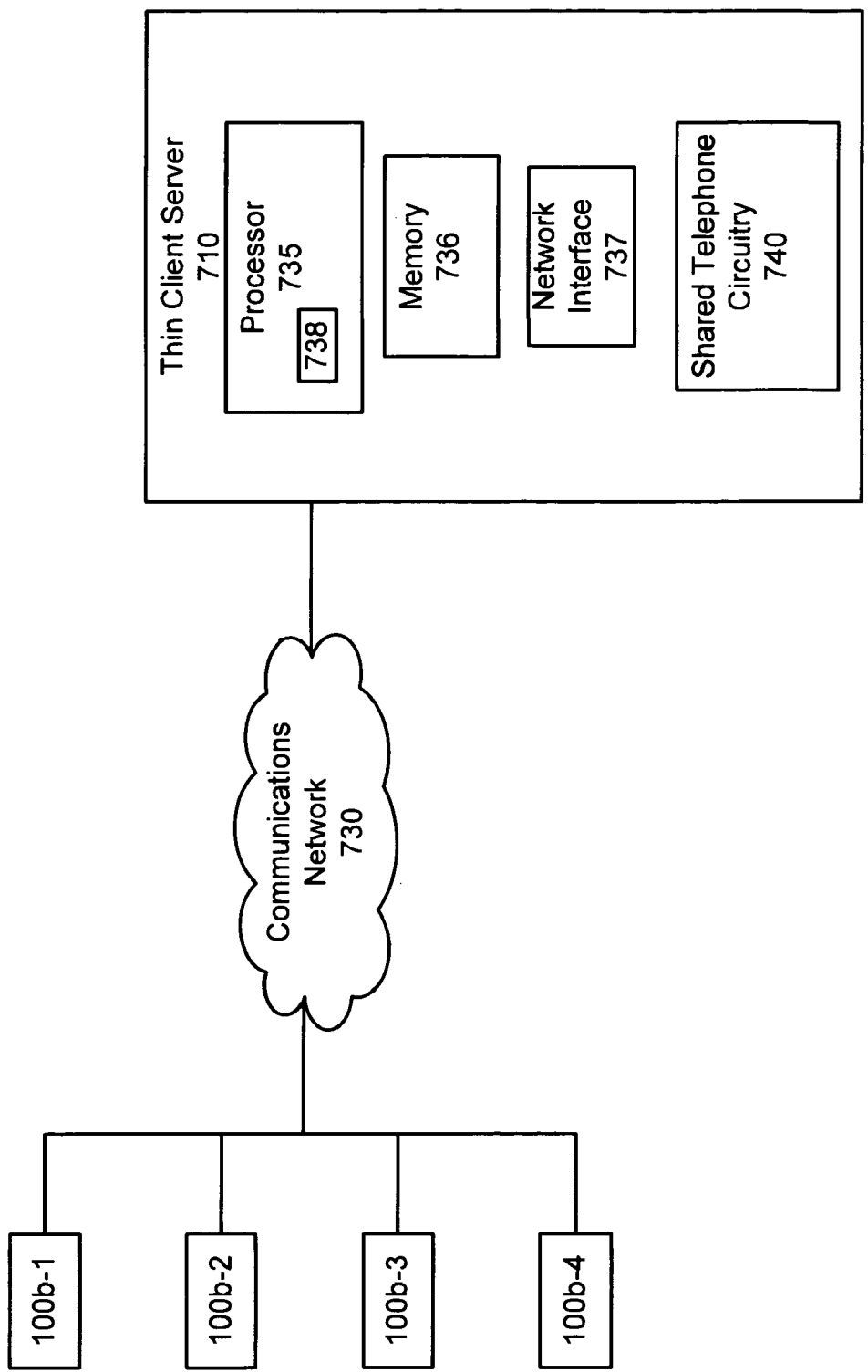
FIG. 7 depicts a system in which a plurality of telephony apparatuses, comprising integrated thin client and telephone devices, are in communication with a thin client server with integrated telephony application handling, according to non-limiting embodiments.

As depicted in FIG. 7, a system 700 can comprise a plurality of telephony apparatuses 100*b* (100*b*-1, 100*b*-2, 100*b*-3, 100*b*-4, collectively telephony apparatuses 100*b* and generically a telephony apparatus 100*b*) connected to a thin client server 710 via a communication network 730. It is understood that while as depicted system 700 comprises four telephony apparatuses 100*b*, system 700 can comprise any suitable number of telephony apparatuses 100*b*. In some embodiments, communications network 730 can comprise a local area network (LAN). It is further understood that each telephony apparatus 100*b*-1, 100*b*-2, 100*b*-3, 100*b*-4 comprises a respective thin client device 410*b*-1, 400*b*-2, 400*b*-3, 400*b*-4).

Thin client server 710 is enabled to process client/server data associated with thin client 410*b* and comprises a processor 735 for processing client/server applications and telephone applications, a memory 736 for storing data associated with the client/server and telephone applications and a network interface 737 for communicating with communications network 730.

Applications being processed by thin client server 710 are generally enabled to receive events from input devices associated with either thin client device 410*b* and stimulus telephone apparatus 420*b* (e.g. input device 130*b*, 320), and further provide output that can be provided by either or both displays associated with thin client device 410*b* and stimulus telephone apparatus 420*b* (e.g. displays 120*b*, 310). Thus, in these embodiments, a telephone server 738 for processing data associated with stimulus telephone devices 420*b* can be another application running on the thin client server 710. In some embodiments of thin client server 710, specialized telephone set circuitry can be retained within the thin client housing, including but not limited to any suitable combination of circuitry, data and algorithms, such as VoIP chips, DSP level algorithms, local applications, hardware CODECs (e.g. CODECs for microphones and speakers at telephony apparatus 100*b*), web clients, or services etc. However other telephone circuitry such as DSPs for echo cancellation in a speakerphone, sidetone generation for a handset, or any other suitable combination of circuitry can be located in a shared telephone circuitry 740 within thin client server 710. Elements from shared telephone circuitry 740 can be assigned, for example on demand, to individual telephone apparatuses 100*b*.

Hence, as compared with thin client servers in the prior art, the functionality of thin client server 710 has been extended with specialized circuitry and software to support telephone applications. The composite thin client server 710 replaces the separate call server and thin client servers of the prior art, and hence achieves cost savings. Such a composite thin client server 710 can be particularly useful within smaller local area networks, in which a single server can provide all required services for a small business, or a branch office for a large enterprise. Furthermore, the subsumption of a telephone into a thin client in the composite thin client server 710, obviates the requirement of the prior art of discovering and storing the association between a separate telephone and thin client.

Figure 8:
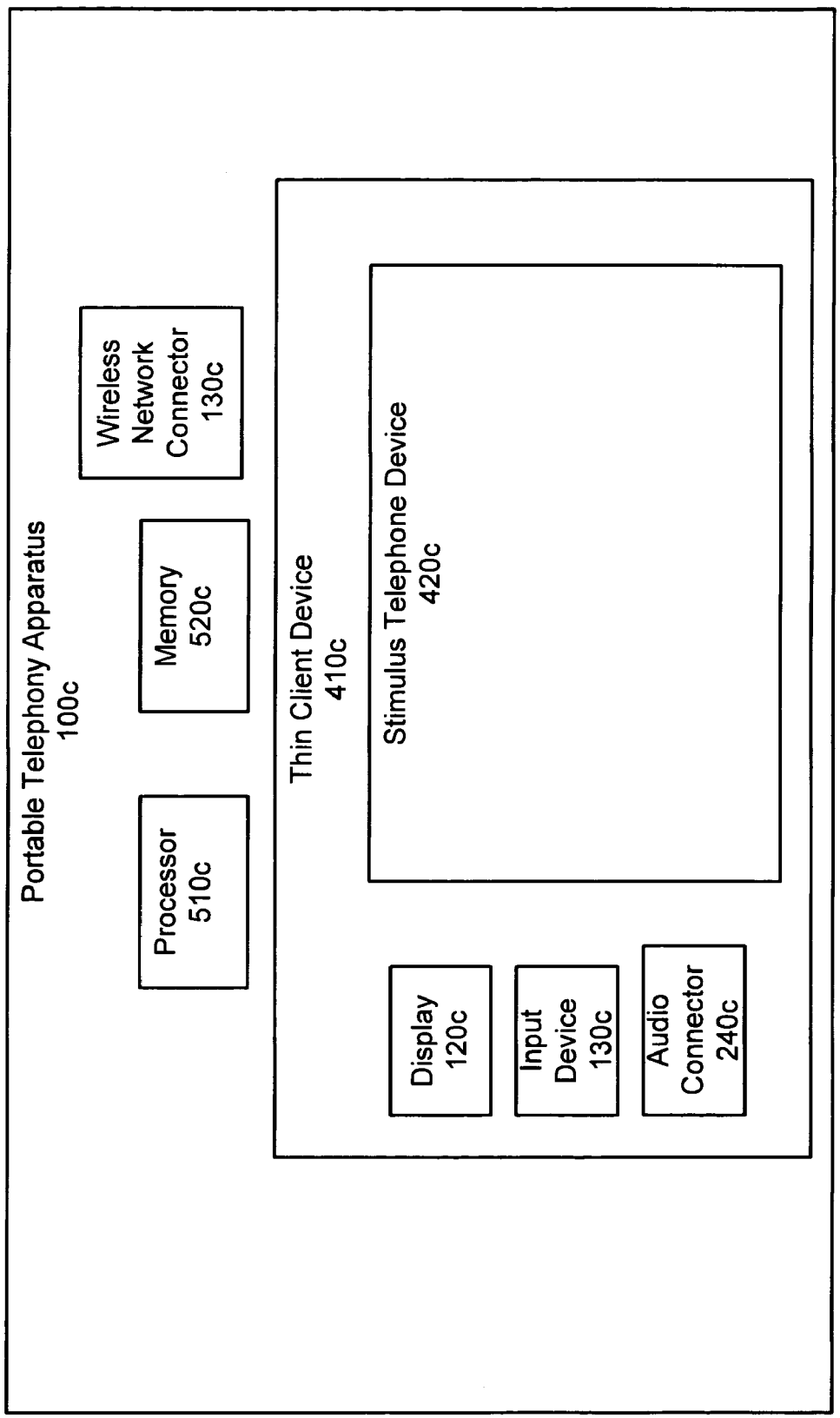
FIG. 8 depicts a block diagram of a telephony apparatuses comprising integrated thin client and telephone devices, according to non-limiting embodiments.

Attention is now directed to FIG. 8, which depicts a wireless telephony apparatus, 100c, similar to telephony apparatus 100b with like elements having like numbers, however with a "c" appended to the end of each number rather than a "b". In particular, portable telephony apparatus 100c comprises a wireless network connector 130c which enables portable telephony apparatus 100c to wireless connect to a communications network. Portable telephony apparatus 100c otherwise has functionality similar to telephony apparatus 100b.

In some embodiments, portable telephony apparatus 100c can comprise at least one of laptop computer, a PDA, a cellphone and the like. In further embodiments, portable telephony apparatus 100c can be enabled to communicate via at least one wireless communication protocol, including but not limited to 3G cellular, 4G cellular, WiFi, WiMax, any suitable wide bandwidth local LAN protocol, two way video protocols, and the like. However, data associated with client/server applications are stored at a server and not at portable telephony apparatus 100c. Hence, if portable telephony apparatus 100c is lost or stolen, the data is not lost. This can be especially useful if portable telephony apparatus 100c is processing client/server applications associated with legal and/or financial and/or commercial and/or medical data, which can be especially privileged and/or sensitive.

In general, portable telephony apparatus 100c comprise a display 120c and at least one input device 130c, each of which respectively provide data for both thin client device 410c and stimulus telephone device 420c. While portable telephony apparatus 100c can comprise connectors to an external display and input device, the provision of such is generally redundant in these embodiments. Instead display 120c is used for all applications. Further, input device 130c can generally comprise a QWERTY keypad, and the like, and any suitable pointing device, including but not limited to a tracking device, a touch sensitive screen, or other pointing device suitable for portable communication devices. Portable telephony apparatus 100c can be further enabled to communicate in a wired manner for telephony applications. Portable telephony apparatus 100c can further comprise a speakerphone.

In operation, portable telephony apparatus 100c can connect via a wired or wireless LAN connection to a wireless area network (WAN) and ultimately to a thin client server, similar to thin client server 710. This is similar to the current use of thin clients in home locations by teleworkers, however implemented via a cellular network, and/or the wired or wireless networks of a hotel, for example. All data and applications are accessed via a network connection. In general, memory 520c may not be available to permanently store data accessible via input device 130c or user-controlled applications. There may be no user or user application-accessible disk or flash memory provided. Thus access to all necessary collaboration applications can be provided via the thin client server, without the problems associated with the handling of sensitive data in portable devices.

Integration of telephone and thin client applications reduces cost and desktop clutter. Furthermore, sharing of packaging, the sharing of a single PCB between a thin client device and a telephone device, the sharing of processor and memory and the subsumption of a telephone device into a thin client device to create a composite desktop collaboration device, provide further advantages and cost-savings. A portable version of a thin client device addresses issues associated with accessing and storing sensitive data.

Those skilled in the art will appreciate that in some embodiments, the functionality of telephony apparatuses 100, 100a, 100b 100c and thin client server 710 can be implemented using pre-programmed hardware or firmware elements (e.g., application specific integrated circuits (ASICs), electrically erasable programmable read-only memories (EEPROMs), etc.), or other related components. In other embodiments, the functionality of telephony apparatuses 100, 100a, 100b 100c and thin client server 710 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A telephony apparatus connectable to a communication network comprising:
   a package having a telephone footprint and comprising at least one connector to said communication network;
   a thin client device housed within said package, said thin client device connectable to a thin client display and a thin client input device;
   a stimulus telephony device housed within said package, said stimulus telephony device comprising a telephony display and telephony input device, said stimulus telephony device connectable to an audio input device; and
   said thin client device and said stimulus telephony device further connectable to said communication network via said at least one connector;
   wherein, said telephony apparatus is coupled to a server comprising a processor enabled to receive input events from both said thin client input device and said telephony input device and process data associated with both said thin client device and said stimulus telephone device.

2. The telephony apparatus of claim 1, wherein said thin client device and said stimulus telephony device are enabled to share said at least one connector.

3. The telephony apparatus of claim 1, wherein said package comprises:
   a telephone housing comprising said stimulus telephony device; and
   a base connected to said telephone housing, said base comprising said thin client device and said at least one connector.

4. The telephony apparatus of claim 1, further comprising a printed circuit board comprising circuitry for said thin client device and said stimulus telephony device.

5. The telephony apparatus of claim 4, wherein said circuitry is shared between said thin client device and said stimulus telephony device.

6. The telephony apparatus of claim 1, further comprising a processor shared between said thin client device and said stimulus telephony device.

7. The telephony apparatus of claim 1, wherein said thin client device comprises said stimulus telephony device.

8. The telephony apparatus of claim 1, wherein said telephone footprint comprises a wireless telephone footprint, and said at least one connector is adapted for connection to a wireless communication network.

9. The telephony apparatus of claim 1, further comprising a display comprising said thin client display and said telephony display.

10. The telephony apparatus of claim 1, further comprising an input device comprising said thin client input device and said telephony input device.

11. The telephony apparatus of claim 1, further comprising at least one of a power supply and a power supply connector.

12. The telephony apparatus of claim 1, wherein said thin client device comprises a thin client card apparatus for accepting a thin client identification card.

13. The telephony apparatus of claim 1, wherein said thin client device and said stimulus telephony device are associated via respective identifiers, such that each of said thin client device and said stimulus telephony device can communicate with the other of said thin client device and said stimulus telephony device.

14. The telephony apparatus of claim 13, wherein said respective identifiers are utilized by at least one external application such that said at least one external application can interact with both said thin client device and said stimulus telephony device in parallel.

15. The telephony apparatus of claim 1, wherein said a package having a telephone footprint comprises at least one of a laptop computer, a PDA, and a mobile communication device.

16. A printed circuit board comprising:
a thin client device connectable to a thin client display and a thin client input device;
a stimulus telephony device connectable to a telephony display, a telephony input device, and an audio input device; and
said thin client device and said stimulus telephony device further connectable to a communication network via at least one connector,
wherein, said printed circuit board is coupled to a server comprising a processor enabled to receive input events from both said thin client input device and said telephony input device and process data associated with both said thin client device and said stimulus telephone device.

17. The printed circuit board of claim 16, wherein said thin client device and said stimulus telephony device are enabled to share said at least one connector.

18. The printed circuit board of claim 16, further comprising circuitry for said thin client device and said stimulus telephony device.

19. The printed circuit board of claim 18, wherein said circuitry is shared between said thin client device and said stimulus telephony device.

20. The printed circuit board of claim 18, wherein said circuitry is shared between said thin client device and said stimulus telephony device.

* * * * *